US012559079B2

(12) United States Patent
Stauder et al.

(10) Patent No.: US 12,559,079 B2
(45) Date of Patent: Feb. 24, 2026

(54) DEVICE FOR ACTIVATING A WHEEL BRAKE OF A VEHICLE, AND METHOD FOR ACTIVATING THE WHEEL BRAKE

(71) Applicant: Continental Automotive Technologies GmbH, Hannover (DE)

(72) Inventors: Peter Stauder, Frankfurt am Main (DE); Marco Besier, Frankfurt am Main (DE)

(73) Assignee: CONTINENTAL AUTOMOTIVE TECHNOLOGIES GMBH, Hannover (DE)

( * ) Notice: Subject to any disclaimer, the term of this patent is extended or adjusted under 35 U.S.C. 154(b) by 565 days.

(21) Appl. No.: 17/983,622

(22) Filed: Nov. 9, 2022

(65) Prior Publication Data

US 2023/0150469 A1 May 18, 2023

(30) Foreign Application Priority Data

Nov. 12, 2021 (DE) ..................... 10 2021 212 784.3

(51) Int. Cl.
B60T 13/74 (2006.01)
F16D 65/16 (2006.01)
(Continued)

(52) U.S. Cl.
CPC ............ B60T 13/746 (2013.01); F16D 65/16 (2013.01); B60T 2270/402 (2013.01);
(Continued)

(58) Field of Classification Search
CPC .... B60T 13/741; B60T 13/746; B60T 17/221; B60T 2270/402; B60L 2200/26;
(Continued)

(56) References Cited

U.S. PATENT DOCUMENTS 4,546,298 A * 10/1985 Wickham ................ F16D 65/54
318/362
6,153,988 A 11/2000 Reimann et al.
(Continued)

FOREIGN PATENT DOCUMENTS

CN 105849432 A 8/2016
CN 108860114 A 11/2018
(Continued)

OTHER PUBLICATIONS

German Examination Report for German Application No. 10 2021 212 784.3, dated Jun. 1, 2022 with translation, 8 pages.
(Continued)

*Primary Examiner* — Robert A. Siconolfi
*Assistant Examiner* — San M Aung
(74) *Attorney, Agent, or Firm* — Buchanan Ingersoll & Rooney PC

(57) ABSTRACT

Provided in a device for activating a wheel brake of a vehicle, having a tensioning installation which has a spindle drive, are two electric motors, the first electric motor by way of a first gear mechanism acting bi-directionally on the spindle drive. In order for the position of the tensioning installation, once attained, to be fixed in a parking brake, a second electric motor by way of a second gear mechanism, which has a self-locking worm gear mechanism and by way of at least one releasable coupling that acts uni-directionally in the activating direction, is coupled to the spindle drive. The coupling is composed of a cam on an output shaft of the first gear mechanism, and a pin on an output element of the worm gear mechanism. Since the cam cannot be reversed beyond the pin, a latching position of the tensioning installation is defined in this way.

11 Claims, 1 Drawing Sheet

(51) Int. Cl.

| | |
|---|---|
| *F16D 121/24* | (2012.01) |
| *F16D 125/40* | (2012.01) |
| *F16D 125/48* | (2012.01) |
| *F16D 125/50* | (2012.01) |
| *F16D 125/52* | (2012.01) |

(52) U.S. Cl.

CPC ...... *F16D 2121/24* (2013.01); *F16D 2125/40* (2013.01); *F16D 2125/48* (2013.01); *F16D 2125/50* (2013.01); *F16D 2125/52* (2013.01)

(58) Field of Classification Search

CPC ...... F16D 51/16; F16D 55/225; F16D 55/226; F16D 65/16; F16D 65/18; F16D 65/183; F16D 65/567; F16D 66/00; F16D 2055/0066; F16D 2055/0091; F16D 2065/386; F16D 2066/003; F16D 2066/005; F16D 2121/24; F16D 2123/00; F16D 2125/36; F16D 2125/40; F16D 2125/48; F16D 2125/50; F16D 2125/52; F16D 2127/06; F16D 2129/08

USPC ........................................................ 188/72.8

See application file for complete search history.

(56) References Cited

U.S. PATENT DOCUMENTS

| | | | |
|---|---|---|---|
| 6,173,820 | B1 | 1/2001 | Blosch et al. |
| 6,431,330 | B1 | 8/2002 | Poertzgen et al. |
| 8,616,348 | B2 | 12/2013 | Winkler et al. |
| 10,612,613 | B2 | 4/2020 | Feigel |
| 2014/0034432 | A1* | 2/2014 | Bull ...................... B60T 13/741 |
| | | | 188/106 R |
| 2016/0377138 | A1 | 12/2016 | Loens |
| 2018/0328430 | A1* | 11/2018 | Feigel .................. B60T 13/746 |
| 2020/0180582 | A1* | 6/2020 | Stohr ................... F16D 65/183 |

FOREIGN PATENT DOCUMENTS

| | | | |
|---|---|---|---|
| DE | 19611910 A1 | 10/1997 | |
| DE | 199 08 062 A1 | 8/2000 | |
| DE | 19741869 C2 | 12/2000 | |
| DE | 101 50 803 A1 | 5/2003 | |
| DE | 103 56 062 A1 | 6/2005 | |
| DE | 102018111573 A1 | 11/2018 | |
| EP | 0551397 B1 | 9/1994 | |
| EP | 0900342 B1 | 8/2002 | |
| EP | 2069655 B1 | 11/2012 | |
| FR | 2337285 A1 | 7/1977 | |
| GB | 2 312 717 A | 11/1997 | |
| WO | WO-2015186365 A1 * | 12/2015 | ............. F16D 65/18 |
| WO | WO-2021158022 A1 * | 8/2021 | ........... F16D 55/226 |

OTHER PUBLICATIONS

Office Action (The First Office Action) issued Jul. 3, 2025, by the State Intellectual Property Office of People's Republic of China in corresponding Chinese Patent Application No. 202211411877.0 and an English translation of the Office Action. (11 pages).

* cited by examiner

DEVICE FOR ACTIVATING A WHEEL BRAKE OF A VEHICLE, AND METHOD FOR ACTIVATING THE WHEEL BRAKE

CROSS REFERENCE TO RELATED APPLICATIONS

This application claims priority to German Patent Application No. 10 2021 212 784.3, filed Nov. 12, 2021, the contents of such application being incorporated by reference herein.

FIELD OF THE INVENTION

The invention relates to a device for activating a wheel brake of a vehicle, having a tensioning installation which has a spindle drive, having a first electric motor which, for activating the tensioning installation, by way of a first gear mechanism is bi-directionally coupled to the spindle drive, and having a second electric motor which, for likewise activating the tensioning installation, is coupled to the spindle drive.

BACKGROUND OF THE INVENTION

Tensioning installations having two electric motors are known. According to EP 0 900 342 B1, incorporated herein by reference, the first electric motor here serves for service braking, and the second electric motor serves for adjusting the clearance, or for readjusting the clearance, after wear on a brake pad, respectively.

According to DE 196 11 910 A1, incorporated herein by reference, the second electric motor is utilized for rapidly overcoming the clearance when service braking, and the first electric motor, upon overcoming the clearance, is utilized for building up the necessary braking force. To this end, the first electric motor is fixedly coupled to the sun gear of a planetary gear mechanism, while the second electric motor drives the ring gear of the latter. A self-locking spindle drive is again fixedly connected to the planet gears of the planetary gear mechanism. The self-locking action of the spindle gear fundamentally permits parking braking. However, in order to be able to release the wheel brake in a parking brake mode in the event of an emergency, at least one of the electric motors must be able to displace the spindle. However, this works only when the other electric motor is able to support the torque. Therefore, either both electric motors must have a self-locking action, this however being associated with poor efficiency, or a dedicated parking brake is additionally required.

DE 197 41 869 A1, incorporated herein by reference, shows a similar tensioning installation, wherein the second electric motor also serves for parking braking. The first electric motor, by way of gear wheels with dissimilar tooth counts, rotates a ramping gear. In this way, a short linear stroke of a brake piston can be generated, which is adequate for braking but not for wear-related readjusting. The second motor, by way of a spur gear, drives a spindle drive which is likewise linearly coupled to the brake piston. The respective linear movements of the brake piston are cumulative. Parking braking is achieved by the self-locking action of at least one of the two drives. Should the drive of the first motor not be self-locking, said first motor for parking braking has to rotate back to the terminal detent, while the second drive moves forward.

To this end, the tensioning installations mentioned provide that both electric motors act bi-directionally on a spindle drive, thus are fixedly coupled to the latter.

In parking braking it is necessary for the achieved tensioning force in the wheel brake to the maintained without that electric motor that has previously generated the tensioning force continuing operation and being supplied with a current. Generally provided to this end are latches that block the tensioning installation as soon as the tensioning force required for parking braking has been built up.

However, in certain situations it is necessary for the tensioning installation either to be re-tensioned or partially released.

Re-tensioning is required, for example, when parking braking is performed with hot brakes, and the friction elements cool down and contract as a result while the parking brake is active.

In such a case, the locking mechanism is released so that the electric motor responsible for parking braking can again activate the tensioning installation in a tensioning direction or else, optionally, in a releasing direction. The issue with this construction is that the wheel brake would be completely released should the current supply fail in this moment when locking is absent.

SUMMARY OF THE INVENTION

An aspect of the invention is thus based on the aim of achieving a tensioning installation which ensures, even when re-tensioning or re-releasing, that the wheel brake is not completely released should the current for the activation motor fail in the process.

For achieving this an aspect of the invention provides that the second electric motor, by way of a self-locking gear mechanism and a releasable coupling that acts in the activating direction, is coupled to the spindle drive.

Since the second electric motor, which is responsible for parking braking, by way of a self-locking gear mechanism is coupled to the spindle drive, the parking brake cannot be released in any case, because the self-locking action of the gear mechanism prevents this—even in the case of a non-energized second electric motor.

It is achieved by the coupling which acts in the activating direction that the first electric motor when service braking can activate the tensioning installation independently of the second motor. The coupling is released specifically when the first electric motor activates the tensioning installation.

In order to achieve bi-directional coupling of the first electric motor to the spindle drive, it is provided that an output shaft of the first gear mechanism is fixedly connected to a spindle rod of the spindle drive.

An output element of the second gear mechanism is disposed so as to be coaxial with the output shaft of the first gear mechanism, and by way of a dog is coupled to the output shaft. This dog represents the coupling that acts in the activating direction.

In order for this to be implemented, the output element of the second gear mechanism is embodied as a spur wheel that concentrically surrounds the output shaft, a cam projecting radially outward from the output shaft, and a pin that can be brought to bear on the cam projecting radially outward from the spur wheel. If the spur wheel is activated when parking braking, the first electric motor is entrained in a non-energized manner.

The pin can protrude from the spur wheel in the axial direction or in the radial direction.

Since the second gear mechanism is self-locking, the tensioning installation remains in position once the latter is attained. This is also the case when re-tensioning or re-releasing is required. In this case, the second electric motor is moved either in the activating direction or counter to the activating direction, said electric motor remaining in each case in a blocked position when non-energized.

With a view to a simpler construction of the assembly, the spur wheel can be rotatably mounted on the output shaft.

It is expedient also in this case for the second gear mechanism to have a worm gear mechanism of a self-locking design.

In terms of the functional mode described so far, it is adequate for the coupling to act uni-directionally in the activating direction. However, the second electric motor can also be utilized for releasing the wheel brake. To this end, an aspect of the invention provides that the second electric motor is coupled to the spindle drive also by way of a releasable coupling that acts in the releasing direction, a distance of free travel, in which coupling is absent, being present between the two coupling positions.

The distance of free travel ensures that not every releasing action of the coupling from the activation position leads to the wheel brake being released. The distance of free travel has first to be overcome so that the coupling acts in the releasing direction and releases the wheel brake.

An aspect of the invention furthermore relates to a method for activating the wheel brake described above.

According to an aspect of the invention, for service braking at least the first electric motor is activated, and for parking braking at least the second electric motor is activated, the first gear mechanism in the case of a non-energized first electric motor being entrained in a rotating manner by way of the closed coupling, and the first and the second electric motor being de-energized when the required tensioning force is reached. When service braking, the second electric motor can of course also be activated, the latter in this instance following the first electric motor, the pin on the spur wheel in the process remaining so as to constantly bear on the cam of the output shaft of the first electric motor.

When parking braking, the first electric motor can also be switched on in addition to the second electric motor. However, it is essential that the second electric motor readjusts the spur wheel to the extent that the pin comes to bear on the cam, thus preventing a reverse rotation of the output shaft of the first electric motor.

For re-tensioning or re-releasing the wheel brake during parking braking, at least the second electric motor is activated, the first gear mechanism in the case of a non-energized first electric motor being entrained in a rotating manner by way of the closed coupling, and the first electric motor and the second electric motor again being de-energized when the required tensioning force is reached.

BRIEF DESCRIPTION OF THE DRAWINGS

An aspect of the invention will be explained in more detail hereunder by means of an exemplary embodiment. In the figures.

DETAILED DESCRIPTION OF THE PREFERRED EMBODIMENTS

Figure 1:
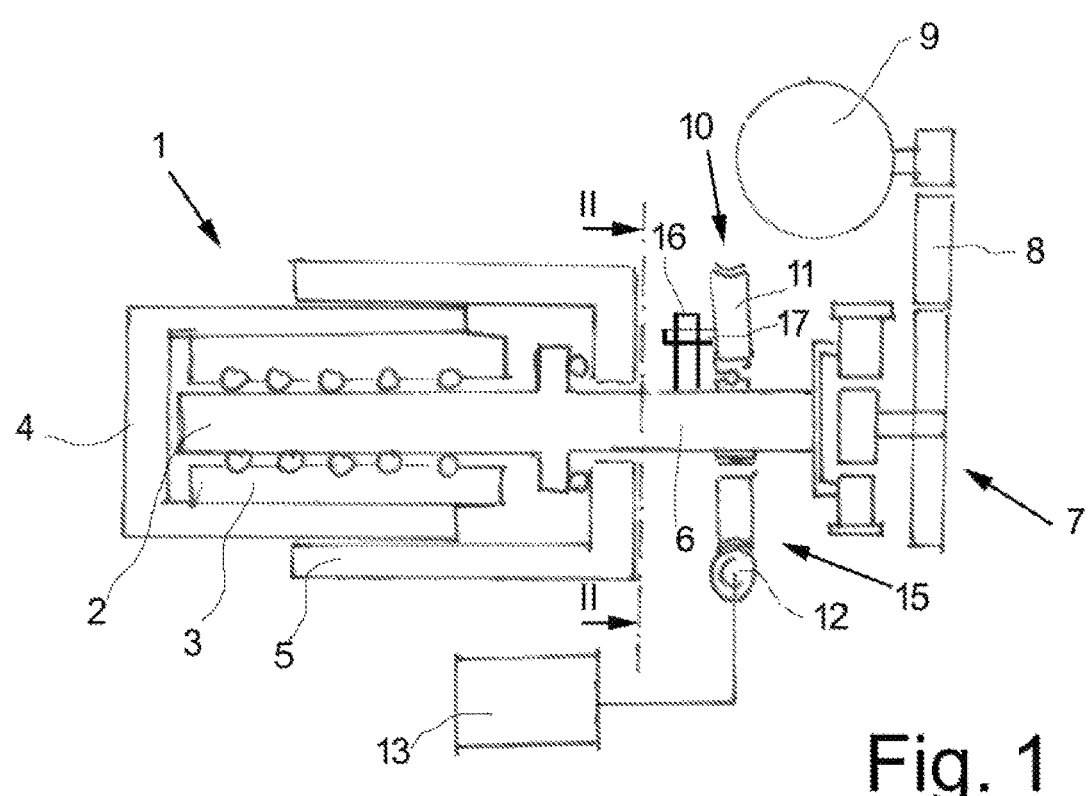
FIG. 1 shows a longitudinal section through a tensioning device according to an aspect of the invention.

The tensioning installation has a spindle drive 1 which is composed of a spindle rod 2 and a spindle nut 3 that is connected to a piston 4 and is mounted so as to be secured in relation to rotating in a sleeve 5, the latter being fixed to the vehicle. A rotation of the spindle rod 4 thus results in the spindle nut 3, conjointly with the piston 4, being pushed in the axial direction out of the sleeve 5. While not illustrated here, the piston 4 bears on a friction element of a wheel brake. The friction element is, for example, the brake pad of a disk brake, or the brake shoe of a drum brake. In a drum brake, the friction element is pressed against a brake drum, or in a disk brake pressed against a brake disk, as a result of which the vehicle is either decelerated from a movement (service braking) or secured in relation to rolling away (parking braking).

In order for frictional forces in the spindle drive 1 to be minimized, the latter can be configured as a recirculation ball gear.

The spindle rod 2 is embodied so as to be integral to an output shaft 6 of a first gear mechanism 7. This here is a sun gear mechanism which by way of a transfer gear mechanism 8 is driven by a first electric motor 9.

The first gear mechanism 7 is designed such that high torques are achieved with a slow-running electric motor, such that a sufficient braking force can be generated in service braking.

Furthermore provided is a second gear mechanism 10. To this end, a spur wheel 11 is mounted on the output shaft 6 so as to be coaxial with the output shaft 6 of the first gear mechanism 7. As is derived from FIG. 2, a worm gear 12, which is driven by a second electric motor 13, meshes with the spur wheel 11. Here too, a sun gear mechanism 14 is disposed upstream of the worm gear 12. It is decisive, however, that a worm gear mechanism 15 that is composed of the spur wheel 11 and the worm gear 12 is of a self-locking design.

A cam 16, which is situated in front of the lateral face of the spur wheel 11, projects radially from the output shaft 6. In order to implement coupling of the second gear mechanism 10 to the output shaft 6, a pin 17 projects laterally in the axial direction from this lateral face, the pin 17 and the cam 16 being situated on the same radius in terms of the axis of the output shaft 6. In an embodiment not shown, the pin 17 can also project in the radial direction from the spur wheel 11, the latter to this end being mounted so as to be concentric with and spaced apart from the output shaft 6, for example.

Figure 2:
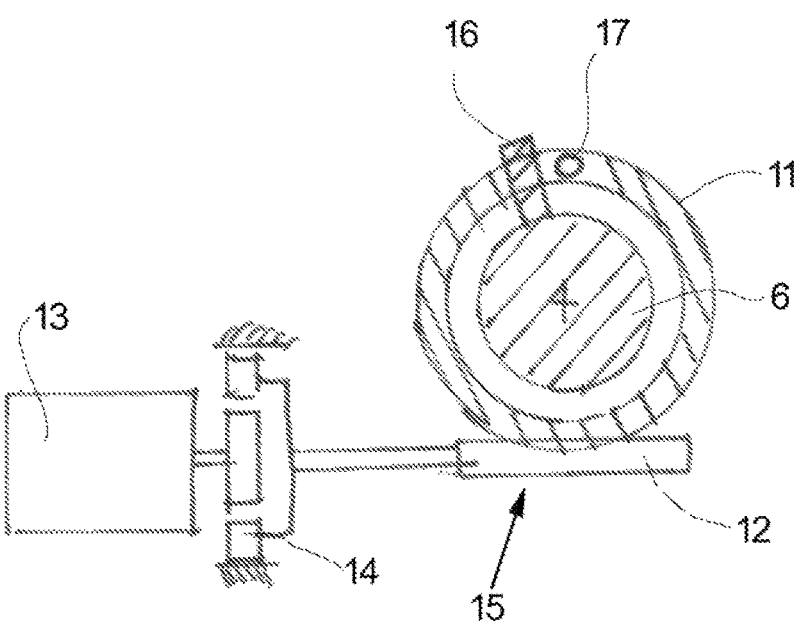
FIG. 2 shows a cross section along the line II-II in FIG. 1, viewed toward a coupling.

The first electric motor 9 is switched on when service braking, so that the output shaft 6 according to FIG. 2 rotates in a counter-clockwise manner, the cam 16 moving away from the pin 17 such that service braking takes place independently of an activation of the second electric motor 13. While the cam 16 in a complete rotation would indeed reach the pin 17 again, this can however be prevented when the stroke of the spindle drive 1 is designed such that a 360° rotation of the spindle rod 2 is sufficient for the wheel brake to be activated.

For parking braking, both electric motors 9, 12, or else at least the second electric motor 13, are/is activated. In this case, the pin 17 follows the cam 16, or pushes along the latter in front, respectively, so that the pin 17 remains so as to bear on the cam 16 and the output shaft 6 and the spur wheel 11, in a non-energized position of the two electric motors 9, 13, remain in the respective position thereof that has been reached. The spur wheel 11 cannot reverse because this is prevented by the worm gear mechanism 15 of a self-locking design. Reversing of the output shaft 6 is prevented because the cam 16 by way of one side (the right side in the illustration of FIG. 2) bears on the pin 17.

In order for the friction elements to be readjusted or released, respectively, both electric motors 9, 13 are switched on, the spindle drive 1, as a result of the self-locking mechanism of the work gear mechanism 15, remaining in the new re-tensioned or partially released position, respectively, once the electric motors 9, 13 have been switched off again. In the event of a failure of the current supply of the second electric motor, the spindle drive 1 maintains the position thereof reached to that point, such that the wheel brake is not completely released in any case.

The second electric motor 13 can also be utilized for releasing a stuck wheel brake, should the first electric motor have failed. To this end, the second electric motor 13 is rotated in the releasing direction such that the pin 17 passes through a distance of 360° of free travel, until said pin 17 bears on the other side of the cam 16 (the left side in the illustration of FIG. 2) and moves the spur wheel 11 in the releasing direction.

LIST OF REFERENCE SIGNS

1 Spindle drive
2 Spindle rod
3 Spindle nut
4 Piston
5 Sleeve
6 Output shaft
7 First gear mechanism
8 Transfer gear mechanism
9 First electric motor
10 Second gear mechanism
11 Spur wheel
12 Worm gear
13 Second electric motor
14 Sun gear mechanism
15 Worm gear mechanism
16 Cam
17 Pin

The invention claimed is:

1. A combined wheel brake for a vehicle comprising:
a device for actuation with an application device having a spindle drive;
a first electric motor for service braking for actuating the application device via a first gear mechanism bi-directionally coupled to the spindle drive, and
a second electric motor for parking braking which is also coupled to the spindle drive for actuating the application device,
wherein the second electric motor is coupled to the spindle drive via a self-locking second gear,
wherein a detachable coupling acting in a direction of actuation is coupled to the spindle drive, and
wherein for service braking at least the first electric motor is activated, and for parking braking at least the second electric motor is activated, the first gear mechanism in the case of a non-energized first electric motor being entrained in a rotating manner by way of the closed coupling, and the first electric motor and the second electric motor being de-energized when the required tensioning force is reached.

2. The combined wheel brake as claimed in claim 1, wherein an output shaft of the first gear mechanism is fixedly connected to a spindle rod of the spindle drive.

3. The combined wheel brake as claimed in claim 2, wherein the output element of the second gear mechanism is coupled to the output shaft of the first gear mechanism by a dog.

4. The combined wheel brake as claimed in claim 1, wherein the output element of the second gear mechanism comprises:
a spur wheel that concentrically surrounds the output shaft,
a cam projecting radially outward from the output shaft, and
a pin projecting radially outward from the spur wheel adapted to bear on the cam.

5. The combined wheel brake as claimed in claim 4, wherein the spur wheel is rotatably mounted on the output shaft.

6. The combined wheel brake as claimed in claim 1, wherein the second gear mechanism has a worm gear mechanism of a self-locking design.

7. The combined wheel brake as claimed in claim 1, wherein the second electric motor is coupled to the spindle drive also by way of a releasable coupling that acts in the releasing direction, a distance of free travel, in which coupling is absent, being present between the two coupling positions.

8. A method for activating a combined wheel brake comprising a service brake and a parking brake, comprising a tensioning installation which has a spindle drive, having:
a first electric motor which, for activating the tensioning installation, by way of a first gear mechanism is bi-directionally coupled to the spindle drive, and
a second electric motor which, for likewise activating the tensioning installation, is coupled to the spindle drive,
wherein the second electric motor, by way a self-locking second gear mechanism and a releasable coupling that acts in the activating direction, is coupled to the spindle drive, and
wherein for service braking at least the first electric motor is activated, and for parking braking at least the second electric motor is activated, the first gear mechanism in the case of a non-energized first electric motor being entrained in a rotating manner by way of the closed coupling, and the first electric motor and the second electric motor being de-energized when the required tensioning force is reached.

9. The method for activating a combined wheel brake as claimed in claim 8, wherein for re-tensioning or re-releasing the wheel brake during parking braking, at least the second electric motor is activated, the first gear mechanism in the case of a non-energized first electric motor being entrained in a rotating manner by way of the closed coupling, and the first electric motor and the second electric motor again being de-energized when the required tensioning force is reached.

10. The device as claimed in claim 2, wherein the output element of the second gear mechanism comprises:
a spur wheel that concentrically surrounds the output shaft,
a cam projecting radially outward from the output shaft, and
a pin projecting radially outward from the spur wheel adapted to bear on the cam.

11. A device for activating a wheel brake of a vehicle, comprising a tensioning installation which has a spindle drive, having:
a first electric motor which, for activating the tensioning installation, by way of a first gear mechanism is bi-directionally coupled to the spindle drive, and
a second electric motor which, for likewise activating the tensioning installation, is coupled to the spindle drive, wherein the second electric motor, by way a self-locking second gear mechanism and a releasable coupling that acts in the activating direction, is coupled to the spindle drive, and an output element of the second gear mechanism is disposed coaxially with an output shaft of the first gear mechanism, and spaced apart radially from the output shaft of the first gear mechanism.

5

\* \* \* \* \*